(12) United States Patent
Faguer et al.

(10) Patent No.: US 9,464,656 B2
(45) Date of Patent: Oct. 11, 2016

(54) SELF-DRILLING FIXING AND ASSEMBLY COMPONENT

(71) Applicant: BOLLHOFF OTALU S.A., La Ravoire (FR)

(72) Inventors: Sylvain Faguer, Arbin (FR); Frédéric Bovagnet, Novalaise (FR); Patrick Lejars, St Alban de Montbel (FR)

(73) Assignee: BOLLHOFF OTALU S.A., La Ravoire (FR)

( * ) Notice: Subject to any disclaimer, the term of this patent is extended or adjusted under 35 U.S.C. 154(b) by 62 days.

(21) Appl. No.: 14/573,698

(22) Filed: Dec. 17, 2014

(65) Prior Publication Data
US 2015/0167722 A1    Jun. 18, 2015

(30) Foreign Application Priority Data
Dec. 18, 2013  (FR) ...................................... 13 02984

(51) Int. Cl.
| | | |
|---|---|---|
| *F16B 25/10* | (2006.01) | |
| *F16B 19/08* | (2006.01) | |
| *F16B 25/00* | (2006.01) | |

(52) U.S. Cl.
CPC ........... *F16B 25/103* (2013.01); *F16B 19/083* (2013.01); *F16B 25/0084* (2013.01)

(58) Field of Classification Search
CPC .. F16B 19/083; F16B 19/06; F16B 25/0084; F16B 25/10; F16B 25/103; F16B 35/044
USPC ......................... 411/387.1, 387.5, 387.8, 501
See application file for complete search history.

(56) References Cited

U.S. PATENT DOCUMENTS

| | | | | |
|---|---|---|---|---|
| 2,654,284 A | * | 10/1953 | Schevenell | ......... F16B 25/0021 408/216 |
| 3,094,893 A | * | 6/1963 | Lindstrom | .......... F16B 25/0031 408/216 |
| 3,318,182 A | * | 5/1967 | Carlson | .................... B21K 1/56 411/387.6 |
| 3,505,923 A | * | 4/1970 | Neill | ...................... F16B 19/06 411/501 |
| 4,257,307 A | * | 3/1981 | Regensburger | ..... F16B 25/0094 408/228 |
| 4,293,258 A | | 10/1981 | McKewan | |

(Continued)

FOREIGN PATENT DOCUMENTS

| | | |
|---|---|---|
| EP | 2 505 856 A2 | 10/2012 |
| WO | WO 2008/011257 A2 | 1/2008 |

*Primary Examiner* — Roberta Delisle
(74) *Attorney, Agent, or Firm* — Oliff PLC

(57) ABSTRACT

The self-drilling component includes a body with a cylindrical side wall, a self-drilling head at a first end of the body and a shank opening out at a second end. The self-drilling component includes a deformable area between the self-drilling head and the second end designed to form a flange when crimping is performed. The self-drilling head further includes a tip defined by three concurrent edges at least two of which are internal cutting edges, the tip enabling engagement of the self-drilling component, at least one external cutting edge placed at the end of the cylindrical side wall configured to cut the fibers of the composite material part, and a first surface parallel to and different from the axial plane containing the axis of rotation of the body, the first surface defining a first empty space in the self-drilling head to facilitate removal of the shavings when drilling is performed.

11 Claims, 1 Drawing Sheet

(56) References Cited

U.S. PATENT DOCUMENTS

| | | | | |
|---|---|---|---|---|
| 5,413,444 A * | 5/1995 | Thomas | ............ | F16B 25/0015 411/29 |
| 5,493,833 A * | 2/1996 | Irimies | ................ | B21K 1/463 219/98 |
| 5,551,818 A * | 9/1996 | Koppel | ............... | F16B 19/083 411/29 |
| 5,749,689 A * | 5/1998 | Konig | ................ | F16B 25/0084 408/231 |
| 6,120,225 A * | 9/2000 | Palm | ................... | F16B 19/083 408/225 |
| 7,077,609 B2 * | 7/2006 | Wirth | ................... | B21J 15/043 411/43 |
| 2005/0002755 A1 * | 1/2005 | Palm | ................ | F16B 25/0031 411/387.1 |
| 2010/0266365 A1 * | 10/2010 | Mair | ................ | F16B 25/0031 411/387.1 |

* cited by examiner

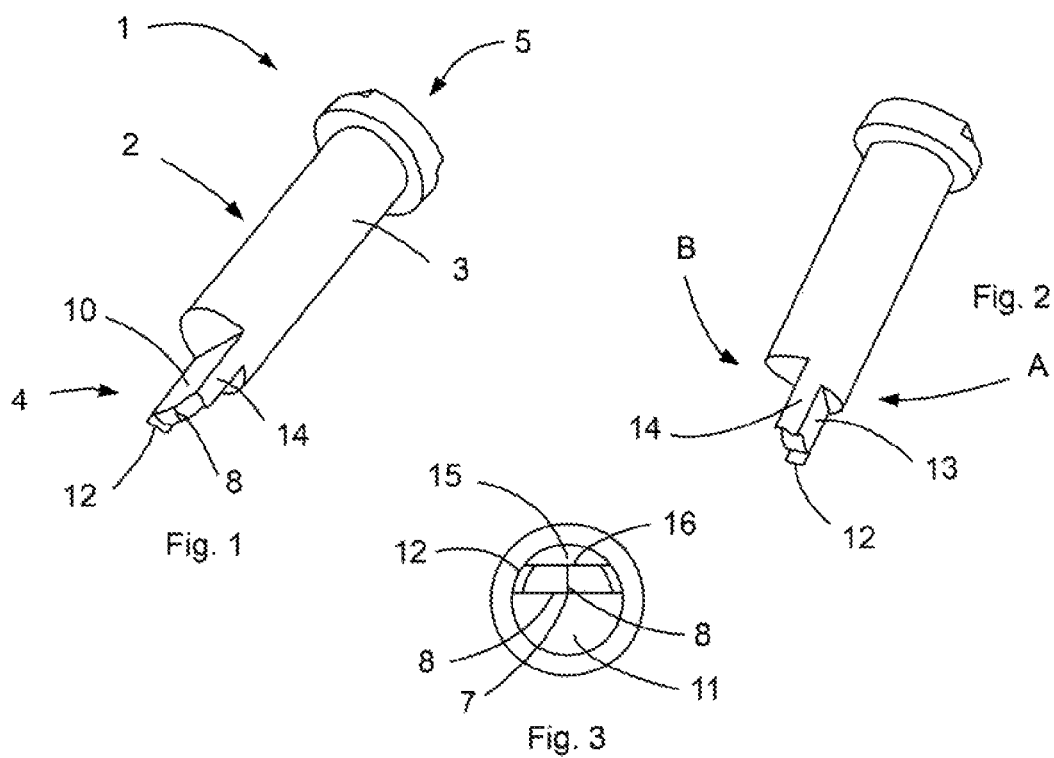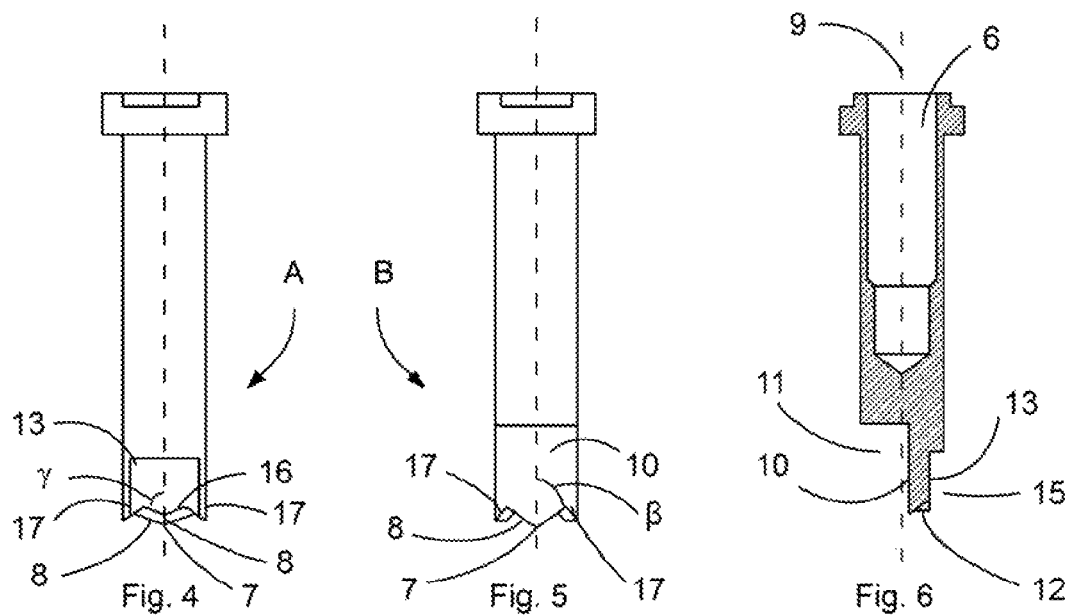

SELF-DRILLING FIXING AND ASSEMBLY COMPONENT

BACKGROUND OF THE INVENTION

The invention relates to a fixing component, and more precisely to a self-drilling component.

STATE OF THE ART

Rivets and studs are commonly used in aeronautics and in the naval or automobile industry to assemble several parts to one another. Generally, the shape of the rivets or studs is suited to the type of material that has to be drilled in order to enable optimized fixing.

The body and/or the underneath of the head of a stud or of a rivet can for example be knurled or notched. The head of the stud or of the rivet can be elliptic. The rivet or stud can be self-drilling or not.

These shapes are well suited for assembling metal parts, but not for assembling parts made from composite materials having a thermosetting or thermoplastic resin-based matrix.

Composite materials are in fact heterogeneous. They can contain different types of resin and different types of fabrics containing more or less long fibres. Parts made from composite materials can therefore delaminate during the machining or punching steps.

At the time the parts are assembled, delamination is not always observable. This can therefore seriously impair the quality of the finished product, which can end up by cracking or breaking. A great deal of precautions therefore have to be taken in performing drilling of the housings for the rivets and studs in composite materials.

Specific tools have to be used to guarantee the quality of the product, in particular in the field of self-drilling rivets and studs as the drilling and assembly are performed in a single step.

OBJECT OF THE INVENTION

One object of the invention is to provide a self-drilling component enabling impairment of composite materials when drilling of the latter is performed to be reduced.

For this purpose, the self-drilling component comprises:
a body provided with a cylindrical side wall,
a self-drilling head at a first end of the body,
a shank opening out at a second end of the body opposite the self-drilling head,
a deformable area located between the self-drilling head and the second end of the body, and designed to form a flange when crimping of the component is performed.

The self-drilling head further comprises:
a tip defined by three concurrent edges at least two of which are internal cutting edges, the tip enabling engagement of the self-drilling component in the composite material part,
at least one external cutting edge placed at the end of the cylindrical side wall,
a first surface parallel to an axial plane containing the axis of rotation of the body, the first surface being different from this axial plane, the first surface defining a first empty space in the self-drilling head to facilitate removal of the shavings when drilling is performed.

At least one of the external cutting edges can form an angle $\alpha$ comprised between $-10°$ and $+10°$ with a radial plane orthogonal to the axis of rotation.

Furthermore, at its end, the first surface can comprise at least one internal cutting edge terminated by the tip, and at least one of the internal cutting edges can form an angle $\beta$ comprised between $70°$ and $75°$ with the axis of rotation.

According to a particular embodiment of the invention, the self-drilling component can comprise a second surface parallel to the first surface, positioned on the same side as the first surface with respect to an axial plane containing the axis of rotation of the body, the second surface defining a second empty space in the self-drilling head to facilitate removal of the shavings when drilling is performed.

In this case, the height of the first surface in a direction parallel to the axis of rotation can be greater than the height of the second surface in this same direction.

At least one of the external edges of the second surface can be a removal edge enabling the shavings to be removed, and at least one of the removal edges can form an angle $\gamma$ comprised between $30°$ and $60°$ with the axis of rotation.

According to one embodiment of the invention, at least one of the external cutting edges can be positioned at the end of at least one tooth.

The self-drilling head can finally have a plane of symmetry orthogonal to the first surface and passing through the axis of rotation.

The present invention also relates to the method for assembling a self-drilling component with a composite material part, the method comprising the following steps:
providing equipment configured to machine and crimp the self-drilling component,
machining the composite material part by means of the self-drilling component,
crimping the self-drilling component.

BRIEF DESCRIPTION OF THE DRAWINGS

Other advantages and features will become more clearly apparent from the following description of particular embodiments of the invention given for non-restrictive example purposes only and represented in the appended drawings, in which:

FIGS. 1 and 2 represent, in schematic manner, perspective views of an embodiment of the self-drilling component, FIG. 3 is a bottom view of the self-drilling component according to the embodiment of FIGS. 1 and 2, FIGS. 4 and 5 are views along the lines A and B of the self-drilling component according to the embodiment of FIGS. 1 and 2, FIG. 6 is a cross-sectional view of the self-drilling component according to the embodiment of FIGS. 1 and 2.

DETAILED DESCRIPTION

A self-drilling component 1 comprises a body 2 comprising a side wall 3, and a self-drilling head 4 at a first end of the body, the shape of which is suitable for drilling parts made from composite materials without causing too much damage to the latter.

In the advantageous embodiment illustrated in the figures, self-drilling component 1 comprises a shank 6 (cf. FIG. 6) opening onto a second end 5 of body 2 opposite self-drilling head 4.

In a particular embodiment, between the two ends 4 and 5, body 2 comprises a deformable area which is designed to form a crimping flange, so that self-drilling component 1 can be fixed to a composite material part situated between the flange and second end 5 of body 2. Self-drilling component 1 can for example be a rivet, a stud or a nut.

Self-drilling head 4 comprises a tip 7 which is the first area of component 1 to come into contact with the composite material part to be drilled. Tip 7 therefore enables engagement of self-drilling component 1 in the material.

Tip 7 is defined by three concurrent edges at least two of which are internal cutting edges 8. Internal cutting edges 8 are in contact with the bottom of the hole when drilling is performed, and their role is therefore to make a clean cut of the material.

Internal cutting edges 8 can advantageously form an angle β comprised between 70° and 75° with an axis of rotation 9 of component 1 corresponding to the longitudinal axis of shank 6. This angle β is well suited to drilling of composite materials as it enables the material to be cut without weakening it. The angles β formed by internal cutting edges 8 and axis of rotation 9 can advantageously be equal.

Tip 7 is furthermore preferably off-centre from axis of rotation 9 of self-drilling component 1, preferably by a few tens of millimeters when the dimensions of the latter are about 3 or 4 cm in length and from 0.5 mm to 1 cm in diameter.

Thus, when self-drilling component 1 is made to rotate along axis 9 to drill the composite material part, tip 7 describes a circle around this axis. This feature advantageously enables self-drilling component 1 to engage the composite material part without having recourse to pre-drilled holes and without making it slide. Offsetting tip 7 from axis of rotation 9 also limits blunting of the latter when drilling is performed.

Furthermore, self-drilling head 4 comprises a first surface 10 parallel to and different from an axial plane containing axis of rotation 9 of self-drilling component 1. First surface 10 is considered as being parallel to an axial plane, but in practice it can form an angle comprised between −10° and +10° with an axial plane. This is due to the machining constraints of self-drilling component 1.

According to an advantageous embodiment, the end of first surface 10 can advantageously correspond to tip 7. The position of this first surface 10 enables self-drilling component 1 to be engaged in the composite material part without sliding.

Self-drilling head 4 further comprises at least one external cutting edge 12 placed at the end of cylindrical side wall 3. The latter is configured to cut the fibres of the composite material part. The position of external cutting edge 12 guarantees the perpendicularity of self-drilling component 1 with respect to the surface of the part to be machined. Splintering by delamination due for example to an askew machining output are thus avoided.

External cutting edge 12 is contained in a plane and forms an angle α with a radial plane orthogonal to axis of rotation 9. The angle α is preferably comprised between −10 and +10° and is advantageously zero. If self-drilling head 4 has several external cutting edges 12, the angles formed by each external cutting edge 12 and a radial plane can advantageously be equal or opposite.

According to a specific embodiment illustrated in the figures, self-drilling head 4 comprises a second surface 13 positioned on the same side as first surface 10 with respect to an axial plane containing axis of rotation 9 of self-drilling component 1.

Second surface 13 can advantageously be parallel to first surface 10. Surfaces 10 and 13 are then separated by an edge 14 preferably measuring a few millimeters in a radial direction orthogonal to axis of rotation 9. Self-drilling component 1 then comprises at least one external cutting edge 12 situated on edge 14, at the end of cylindrical side wall 3. The end of edge 14 corresponds to one of internal cutting edges 8.

The height of second surface 13 in a direction parallel to axis of rotation 9 is advantageously smaller than that of first surface 10 in this same direction in order to guarantee the solidity of component 1 and to prevent damage to the latter. This property also limits the risks of sliding of component 1 when engaging in the composite material part.

Furthermore, second surface 13 arranges a second empty space 15 playing an identical role to first empty space 11, i.e. limiting friction when drilling is performed and storing of the shavings created when cutting is performed.

To facilitate removal of the shavings to first and second empty spaces 11 and 15, second surface 13 can comprise at least one removal edge 16. This removal edge 16 advantageously forms an angle γ with axis of rotation 9 which is smaller than the angle β formed by internal cutting edge 8 and axis of rotation 9, to enable removal of the shavings created by external cutting edges 12 and internal cutting edges 8. As the shavings are removed as soon as they are formed to first and second empty spaces 11 and 15, this both prevents overheating of component 1 and facilitates penetration into the material to be drilled.

According to a particular embodiment, removal edge 16 forms an angle γ with axis of rotation 9 which is comprised between 30° and 60°. If self-drilling head 4 comprises several removal edges 16, the angles γ formed by removal edges 16 and axis of rotation 9 can advantageously be equal.

According to the particular embodiment illustrated in the figures, self-drilling head 4 is symmetrical along an axial plane orthogonal to first surface 10.

Furthermore, as illustrated in the figures, the end of self-drilling head 4 can be substantially M-shaped, i.e. comprise two teeth 17 along lateral surface 3 of body 2, whereas tip 7 is equidistant from each tooth 17. In this particular embodiment, the end of at least one of teeth 17 is provided with an external cutting edge 12.

An embodiment can also be envisaged where self-drilling head 4 only comprises a single tooth 17, or even an embodiment wherein self-drilling head 4 does not comprise any teeth. The advantage of the M-shape is the small height difference between tip 7 and external cutting edge or edges 12 which enable side wall 3 of body 2 to guide self-drilling component 1 as soon as the latter engages in the material and to prevent askew machining.

Self-drilling components 1 such as those which have been described in the foregoing can for example be rivets, studs or nuts. They are preferably made from stainless steel in order not to be impaired in contact with carbon fibres which may be present in the composite material part.

Installation of a component 1 on a composite material part is performed in two steps. The first corresponds to a drilling operation whereas the second corresponds to a crimping operation of component 1 by deformation of the deformable part of body 2 until a flange appears.

More precisely, during the drilling step, the user screws the component into the material machining the latter by means of external 12 and internal 8 cutting edge or edges. The shavings created by the edges are removed from the bottom of the hole and are accommodated in first and second empty spaces 11 and 15.

Crimping then has to be performed by exerting a tractive force in order to deform component 1. The two steps of the installation can advantageously be performed with a single piece of equipment, for example with a crimper.

In order to achieve high-quality drilling, the speed of rotation of the component when drilling is performed has to be controlled. It is up to the person skilled in the art to choose a cutting speed and an advance suitable for the material which is being drilled. It is in particular judicious to engage and terminate the drilling step limiting the advancing movement in order to guarantee the quality of machining of the composite material.

The present invention is not limited to the embodiments which have been described in the foregoing. All the dimensions of self-drilling component 1 can be adapted to the type of part to be drilled. The person skilled in the art can in particular choose the height of first and second surfaces 10 and 13 in order to create first and second empty spaces 11 and 15 of sufficiently large volumes to be able to house all the shavings when drilling is performed, to prevent overheating of self-drilling component 1.

The invention claimed is:

1. A self-drilling component designed to drill a composite material part by rotation along an axis of rotation, the self-drilling component comprising
   a body provided with a cylindrical side wall,
   a self-drilling head at a first end of the body,
   a shank opening out at a second end of the body opposite the self-drilling head,
   a deformable area arranged between the self-drilling head and the second end of the body, and designed to form a flange when crimping of the component is performed, wherein the self-drilling head comprises
   a tip defined by three concurrent edges at least two of which are internal cutting edges, the tip enabling engagement of the self-drilling component in the composite material part,
   at least one external cutting edge placed at the end of the cylindrical side wall,
   a first surface parallel to an axial plane containing the axis of rotation of the body, the first surface being different from this axial plane, the first surface defining a first empty space in the self-drilling head to facilitate removal of the shavings when drilling is performed.

2. The self-drilling component according to claim 1, wherein at its end the first surface comprises at least one internal cutting edge terminated by the tip.

3. The self-drilling component according to claim 2, wherein at least one of the internal cutting edges forms an angle $\beta$ comprised between 70° and 75° with the axis of rotation.

4. The self-drilling component according to claim 1, wherein at least one of the external cutting edges forms an angle $\alpha$ comprised between −10° and +10° with a radial plane orthogonal to the axis of rotation.

5. The self-drilling component according to claim 1, comprising a second surface parallel to the first surface, positioned on the same side as the first surface with respect to an axial plane containing the axis of rotation of the body, the second surface defining a second empty space in the self-drilling head to facilitate removal of the shavings when drilling is performed.

6. The self-drilling component according to claim 5, wherein the height of the first surface in a direction parallel to the axis of rotation is greater than the height of the second surface in this same direction.

7. The self-drilling component according to claim 5, wherein the self-drilling head comprises at least one removal edge positioned at the end of the second surface to enable removal of the shavings.

8. The self-drilling component according to claim 7, wherein at least one of the removal edges forms an angle $\gamma$ comprised between 30° and 60° with the axis of rotation.

9. The self-drilling component according to claim 1, wherein at least one of the external cutting edges is positioned at the end of at least one tooth.

10. The self-drilling component according to claim 1, wherein the self-drilling head has a plane of symmetry orthogonal to the first surface and passing via the axis of rotation.

11. A method for performing assembly of a composite material part with a component according to claim 1, comprising the following steps
    providing equipment configured to machine the composite material part, machining the composite material part by means of the self-drilling component,
    crimping the self-drilling component.

* * * * *